United States Patent [19]
Sharyo et al.

[11] Patent Number: 5,879,509
[45] Date of Patent: Mar. 9, 1999

[54] DEINKING OF STARCH-COATED PRINTED PAPER BY TREATMENT WITH STARCH DEGRADING ENZYME

[75] Inventors: Masaki Sharyo, Matsudo; Hidesato Shimoto, Funabashi; Hiromichi Sakaguchi, Chiba, all of Japan

[73] Assignee: Novo Nordisk A/S, Bagsvaerd, Denmark

[21] Appl. No.: 640,869

[22] PCT Filed: Nov. 23, 1994

[86] PCT No.: PCT/DK94/00437

§ 371 Date: May 15, 1996

§ 102(e) Date: May 15, 1996

[87] PCT Pub. No.: WO95/14807

PCT Pub. Date: Jun. 1, 1995

[30] Foreign Application Priority Data

Nov. 23, 1993 [DK] Denmark .................................. 1311/93

[51] Int. Cl.⁶ ............................ D21H 11/20; D21H 25/02
[52] U.S. Cl. .................................. 162/5; 162/72; 435/278
[58] Field of Search .................................. 162/5, 72, 55, 162/25, 28; 435/277, 278, 274, 275

[56] References Cited

U.S. PATENT DOCUMENTS

| | | | |
|---|---|---|---|
| 3,616,219 | 10/1971 | Massey | 195/31 |
| 3,652,383 | 3/1972 | de Vos | 162/5 |
| 4,450,043 | 5/1984 | Schulz | 162/5 |

FOREIGN PATENT DOCUMENTS

| | | |
|---|---|---|
| 91/14819 | 10/1991 | WIPO . |
| 92/20857 | 11/1992 | WIPO . |

OTHER PUBLICATIONS

Abstract JP –Dialog File 351, WPI Accession No. 84–051743/09.

*Primary Examiner*—Steven Alvo
*Attorney, Agent, or Firm*—Steve T. Zelson; Elias Lombinis

[57] ABSTRACT

In the production of pulp and paper from starch-coated paper, the deinking effect can be improved by including a treatment with a starch-degrading enzyme e.g. amylase or a debranching enzyme. The process comprises enzyme treatment before, during or after disintegration of the paper to produce pulp, followed by separation of ink particles.

24 Claims, No Drawings

DEINKING OF STARCH-COATED PRINTED PAPER BY TREATMENT WITH STARCH DEGRADING ENZYME

CROSS-REFERENCE TO RELATED APPLICATIONS

This application is a continuation of PCT/DK94/00437 filed Nov. 23, 1994, which is incorporated herein by reference.

TECHNICAL FIELD

This invention relates to processes for producing a papermaking pulp and producing new paper from old starch-coated printed paper. More particularly, it relates to such processes with improved ink removal leading to improved brightness of the pulp or paper.

BACKGROUND ART

In the recycling of old starch-coated printed paper such as old newspapers and magazines for use in papermaking, it is usually desirable to remove the printing ink in order to produce new paper of high brightness. It is therefore conventional to repulp (or disintegrate) the old paper together with deinking chemicals, such as deinking surfactant, NaOH and sodium silicate, followed by bleaching with hydrogen peroxide and deinking chemicals and by separation of ink particles from the pulp.

A number of documents in the prior art describe the use of enzymes to improve ink removal. Thus, Japanese laid-open patent application Kokai Sho 59-9299 (Kao), Japanese laid-open patent application Kokai Sho 63-59494 (Honshu Paper), Japanese laid-open patent application Kokai Hei 2-80683 (Oji Paper) and WO 91/14819 (Novo Nordisk) describe the use of a cellulase, i.e. an enzyme acting on the cellulose fibers of paper. Japanese laid-open patent application Kokai Hei 2-160984 (Novo Nordisk) and Japanese laid-open patent application Kokai Hei 2-80684 (Lion) describe the use of a lipase, i.e. an enzyme acting on triglycerides in the printing ink.

It is the object of this invention to provide an improved process for removal of printing ink for use in the recycling of old starch-coated paper.

STATEMENT OF THE INVENTION

Surprisingly, we have found that in the production of pulp and paper from starch-coated paper, the deinking effect can be improved by including a treatment with a starch-degrading enzyme.

Accordingly, the invention provides a process for producing a papermaking pulp from starch-coated printed paper, comprising the following steps:

a) disintegrating the paper to produce a pulp, b) treating with a starch-degrading enzyme before, during or after step a), and c) separating ink particles from the pulp after steps a) and b).

The invention also provides a process for recycling old starch-coated printed paper into new paper, comprising producing a pulp by the above process, followed by papermaking.

DETAILED DESCRIPTION OF THE INVENTION

Starch-coated printed paper

The process of the invention is applicable to the recycling of any kind of printed, starch-coated paper. Typical examples are old newspaper, magazines and printed stationery. The paper may contain mineral fillers such as calcium carbonate and clay.

The starch coating may consist of starch from any source and generally contains 20–30% of amylose and the balance amylopectin. Typical examples are corn starch, wheat starch, potato starch, rice starch and tapioca starch. Starch to be used as a coating material will generally be pretreated to achieve a limited hydrolysis by cooking with amylase or acid.

The starch coating may also consist of modified starch. Modified starches useful for paper coating include dextrin (e.g. white dextrin, canary dextrin or British gum), acid-modified starch, oxidized starch (chlorinated starch), hydrozyethylated starch and cationic starch.

The inks to be removed by the process of this invention include but are not limited to non-contact laser inks, xerographic toners, letterpress ink generally used in printing newsprint, magazine print, offset printing ink, ultraviolet or electron beam cured ink.

Disintegration

The disintegration step may be done in a conventional pulper, typically for 5–30 minutes at 3–30% pulp consistency. If the enzyme treatment is completed before the disintegration, conventional deinking chemicals can be used in the disintegration.

Conventional deinking chemicals typically comprise an alkaline reagent and a surfactant. The surfactant can, e.g., be used at a dosage of 0.2–0.6%. The surfactant is preferably nonionic, e.g. ethoxylated octyl or nonyl phenol or any of the nonionic surfactants disclosed in Park et al., 1992, Biotechnology and Bioengineering 39:117–120. The alkaline reagent may be NaOH (e.g. 0.2–5%) and/or sodium silicate (e.g. 0.4–5%). The alkaline reagents are usually added to a pH of 8–12. The deinking chemicals may further comprise magnesium sulfate, an organic solvent such as kerosene, and sodium sulfite.

If the enzyme treatment is done during or after the disintegration, it may be preferable to modify the addition of deinking chemicals (as described further below) in order to provide suitable conditions for the action of the enzyme, and particularly to reduce or avoid the addition of alkaline reagent to achieve a pH which is suitable for the enzyme action.

Starch-degrading enzyme

The starch-degrading or amylolytic enzyme is preferably an amylase, e.g. an α-amylase, a glucoamylase or a debranching enzyme. A single enzyme or a combination may be used, e.g. α-amylase together with glucoamylase and/or a debranching enzyme. It is preferred to carry out the enzyme treatment at an alkaline pH in the range 6–10, preferably 8–10 and to use an enzyme which is alkaline stable and active in this range and preferably has optimum activity in this range.

Examples of preferred α-amylases are those derived from strains of Bacillus, e.g. *B. amyloliquefaciens* (*B. subtilis*), *B. licheniformis* or *B. stearothermophilus* and from strains of Aspergillus, e.g. *A. oryzae*. Examples of commercial products are BAN™, Termamyl®, Aquazyme Ultra™ and Fungamyl™ (products of Novo Nordisk A/S).

Glucoamylase derived from a strain of *Aspergillus niger* is preferred, e.g. the commercial product AMG (product of Novo Nordisk).

The debranching enzyme is preferably a pullulanase, particularly one derived from a strain of *Bacillus acidopullulyticus*, e.g. the commercial product Promozyme® (product of Novo Nordisk).

The process conditions are selected so as to increase the brightness of the pulp after the deinking and the brightness of the new paper. Suitable conditions for Bacillus amylase may be pH 4–10, 20°–90° C., preferably pH 6–10, 40°–70° C. Suitable conditions for *A. oryzae* amylase may be pH 3–8, 20°–70° C. A suitable reaction time may be found in the range 10 min—24 hours, particularly 10 min—3 hours at an amylase dosage of 0.01–10 KNU/g dry matter (1 KNU= 1000 NU, unit defined in U.S. Pat. No. 4,933,279), preferably 0.03–3 (or 0.06–6) KNU/g of dry matter.

Optionally, one or more other enzymes, such as lipase, cellulase, protease and/or hemicellulase, can be used together with the starch-degrading enzyme to further improve the deinking efficiency.

Stirring may optionally be used during the enzymatic treatment.

Enzyme treatment

As stated above, the enzyme treatment may be done before, during or after the disintegration, and these alternatives will now be discussed.

Enzyme treatment before disintegration

The treatment with a starch-degrading enzyme can be done before the disintegration, e.g. by soaking the paper, either as it is or after shredding or cutting, in an aqueous solution of the starch-degrading enzyme. The bath ratio (i.e., the weight ratio of the enzyme solution to the paper) is preferably above 10, and the enzyme treatment is preferably done in the presence of a surfactant. In the case of an α-amylase from Bacillus it is preferred to add alkaline reagents (typically NaOH and sodium silicate) to achieve a suitable pH, e.g. pH 8–10 (preferably 8–9).

Preferably, the enzyme treatment is followed by additional separation of ink particles before the disintegration. The subsequent disintegration may be done in a conventional manner in the presence of deinking chemicals.

The disintegration may be followed by conventional bleaching with hydrogen peroxide and deinking chemicals before the ink separation. Preferably, separation of ink particles is done both before and after the bleaching.

Enzyme treatment during disintegration

Alternatively, the enzyme treatment may be done during the disintegration. In this case, the enzyme treatment may optionally be continued by holding the pulp after the disintegration.

The enzyme treatment is preferably done in the presence of a surfactant, and in the case of an α-amylase from Bacillus it is preferred to add alkaline reagents (typically NaOH and sodium silicate) to achieve a suitable pH, e.g. pH 8–10 (preferably 8–9).

The disintegration and enzyme treatment may be followed by conventional bleaching with hydrogen peroxide and deinking chemicals before the ink separation. Preferably, separation of ink particles is done both before and after the bleaching.

Enzyme treatment after disintegration

The enzyme treatment may be done by adding enzyme to the pulp after disintegration. In a preferred embodiment, this is done simultaneously with hydrogen peroxide bleaching, preferably in the presence of a surfactant. In the case of simultaneous bleaching and treatment with an α-amylase from Bacillus, it is preferred to add 0.5–2% $H_2O_2$ and alkaline reagents (typically NaOH and sodium silicate, e.g. 1–5% sodium silicate and 0.5–5% NaOH) so as to achieve pH 9–10. The combined bleaching and enzyme treatment is preferably done at 30°–60° C. for 1–3 hours.

Separation of ink particles

After the disintegration and enzyme treatment, ink particles may be separated from the pulp in a conventional manner, such as by mechanical deinking, flotation, chemimechanical deinking, agglomeration chemistry (see e.g. McBride, Pulp and Paper, April 1994, Miller Freeman Publishers, San Francisco, p. 44), washing, cycles of dilution and filtration, treatment in hydrolcyclones, or by a suitable combination of these.

Papermaking

After deinking according to the invention, the deinked pulp is generally mixed with other pulp, e.g. kraft pulp and mechanical pulp etc., before papermaking. The final papermaking step can be done in a conventional papermaking machine.

EXAMPLES

Example 1

Enzyme treatment before disintegration with deinking chemicals

Two kinds waste paper were treated by the process of the invention: Printed fine paper, mainly containing kraft pulp, off-set printed, starch coated, 8 months aged. Japanese regular newspaper containing deinked pulp, mechanical pulp, kraft pulp etc., off-set printed, starch coated, 4 months aged at room temperature.

10 g of the waste paper was cut by a shredder, suspended in water at 1% concentration, 65° C., pH 7.2. α-amylase (Aquazyme Ultra) was added in an amount of 0.3 KNU/g paper, and the mixture was kept for 60 minutes without agitation.

Rinsing was done with 2 l of water, twice.

Disintegration was done in a laboratory mixer for disintegration of paper at 4% pulp concentration, 55° C. for 10 minutes with the following deinking chemicals: 0.3% of surfactant (Liptool 160H, product of Nikka Kagaku KK, Japan), 0.5% NaOH and 0.8% sodium silicate.

Washing was done with 2 l of water, twice.

A paper sheet was made on an 80 mesh wire (16 cm diameter).

A control experiment was done by the same procedure, but without the enzyme treatment.

Brightness of the paper sheet was measured at 457 nm in a spectrophotometer equipped with an integrating sphere. The results are given as brightness (standard deviation in parentheses) for the experiment according to the invention and for the control experiment, and the increase in brightness is calculated.

| Type of newspaper Aging time | Printed fine 8 months | Regular 4 months |
| --- | --- | --- |
| Invention | 57.9 (0.4) | 38.3 (0.3) |
| Control | 54.8 (0.8) | 36.6 (0.5) |
| Increase | 3.1 | 1.7 |

Example 2

Enzyme treatment before disintegration without deinking chemicals

The same two types of old newspaper as in Example 1 were subjected to enzyme treatment, followed by disintegration, flotation and washing, as follows:

a) The old newspaper was cut approx. to 3×3 square cm and 100 g (dry substance) was weighed out. The paper was mixed with 1800 ml hot water (45° C.) and enzyme solution was added. The enzyme was α-amylase (Aquazyme Ultra) at a dosage of 0.5 KNU/g of dry pulp, in 100 ml of buffer at pH 7 (Britton-Robinson, universal Buffer l).

b) The mixture was incubated in a plastic bag in a water bath at 50° C. for 30 min. and then disintegrated in a disintegrator at 45,000 rotations in 15 min at 45°–50° C. at pH 7 and pulp consistency 5%.

c) After dilution (to 0.5% pulp consistency), the pulp was replaced to flotation cell and agitated for 20 min. by mixer. Flotation conditions were 50° C., pH 7, 10 min., 2000 rpm for air flow. Ink coming up with bubbles was scratched out.

d) Washing was done by taking 4 L of pulp after the flotation and washing 1 L each at 50° C., pH 7 on an 80 mesh sieve and filling up to 2.5 L.

e) Paper sheets were made from pulp after the flotation and from pulp after the washing in a conventional manner. The brightness of the paper sheets was measured in a spectrophotometer with a blue filter.

Control sheets were made by the same procedure, but without the enzyme addition. The results are given as brightness for the experiment according to the invention and for the control experiment, and the increase in brightness is calculated.

| Newspaper | Printed fine 6 months | | Regular 3 months | |
| --- | --- | --- | --- | --- |
| Aging time Brightness | After flotation | After washing | After flotation | After washing |
| Invention | 62.9 | 68.5 | 46.3 | 52.7 |
| Control | 57.2 | 64.9 | 45.1 | 50.9 |
| Increase | 5.7 | 3.6 | 1.2 | 1.8 |

Example 3

Enzyme treatment during and after disintegration without deinking chemicals

Old newspaper was treated in the same manner as in Example 2, except that in step b), the mixture was first disintegrated (at the same conditions) and then incubated in a plastic bag (at the same conditions). The results were as follows:

| Newspaper | Printed fine 6 months | | Regular 3 months | |
| --- | --- | --- | --- | --- |
| Aging time Brightness | After flotation | After washing | After flotation | After washing |
| Invention | 61.2 | 67.2 | 46.9 | 52.3 |
| Control | 57.5 | 64.0 | 43.7 | 49.3 |
| Increase | 3.7 | 3.2 | 3.2 | 3.0 |

The results of the examples show a clear effect of the enzyme treatment, both before during and after the disintegration, both with and without deinking chemicals and with both kinds of waste paper tested.

We claim:

1. A process for producing a papermaking pulp of increased brightness, comprising the following steps:

a) disintegrating a starch-coated printed paper to produce a pulp, b) treating the pulp with a starch-degrading α-amylase before, during or after step a), and c) separating ink particles from the pulp after steps a) and b), to produce a pulp of increased brightness compared to a pulp produced from starch coated paper without α-amylase.

2. The process according to claim 1 wherein the enzymatic treatment is performed at a pH in the range 6–10.

3. The process of claim 2, wherein the pH range is 8–10.

4. The process of claim 1 wherein the α-amylase is derived from a strain of Bacillus.

5. The process of claim 4, wherein the amount of α-amylase in the range 0.01–10 KNU/g of dry matter.

6. The process of claim 4, wherein the Bacillus strain is one of *Bacillus amyloliquefaciens, Bacillus licheniformis* or *Bacillus stearothermophilus*.

7. The process of claim 1, wherein the enzyme treatment is performed before the disintegration.

8. The process of claim 7, wherein the enzyme treatment is performed in the presence of a surfactant.

9. The process of claim 8, wherein the enzyme is an alkaline stable Bacillus α-amylase, and the enzyme treatment is performed in the presence of an alkaline reagent at a pH in the range 8–10.

10. The process of claim 9, wherein the pH is in the range of 8–9.

11. The process of claim 7, further comprising shredding or cutting of the paper before the enzyme treatment.

12. The process of claim 7, further comprising bleaching after the disintegration, but before the ink separation.

13. The process of claim 7, additionally comprising separation of ink particles after the enzyme treatment, but before the disintegration.

14. The process of claim 1, wherein the enzyme treatment is performed simultaneously with the disintegration.

15. The process of claim 14 wherein the enzyme treatment and disintegration are performed in the presence of a surfactant.

16. The process of claim 15 wherein the enzyme is an alkaline stable Bacillus α-amylase, and the enzyme treatment is performed in the presence of an alkaline reagent at a pH in the range 8–10.

17. The process of claim 16, wherein the pH is in the range of 8–9.

18. The process of claim 16, wherein the enzyme treatment is continued after the disintegration.

19. The process of claim 14, comprising the following sequential steps after the disintegration and the enzyme treatment:

(i) a first separation of ink particles, (ii) bleaching, and (iii) a second separation of ink particles.

20. The process of claim 1, wherein the enzyme treatment is done after the disintegration.

21. The process of claim 20 wherein the enzyme treatment is done simultaneously with bleaching.

22. The process of claim 21 wherein the enzyme treatment and bleaching are done in the presence of hydrogen peroxide and a surfactant.

23. The process of claim 22 wherein the enzyme is an alkaline stable enzyme, preferably a Bacillus α-amylase, and the enzyme treatment is done in the presence of an alkaline reagent, preferably at a pH in the range 8–10, preferably 9–10.

24. A process for making new paper from starch-coated printed paper, comprising producing a papermaking pulp by the process of claim 1, and making the new paper from the pulp.

* * * * *